J. G. CHRISTOPHER.
Cultivator.
No 27,776. Patented Apr. 10, 1860.
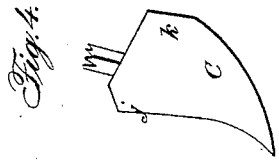
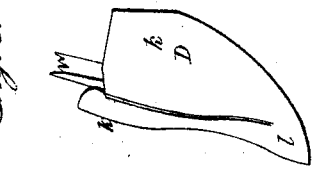
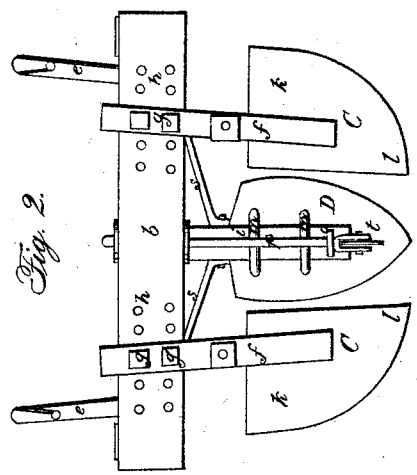
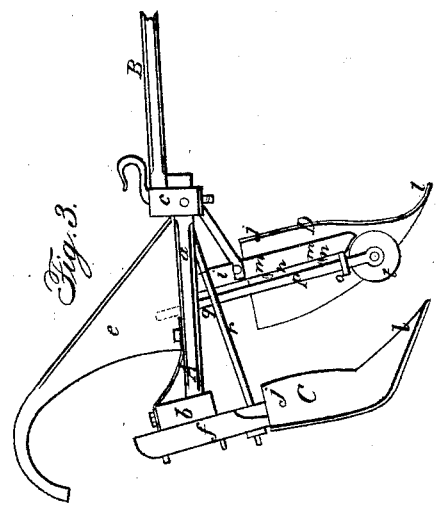
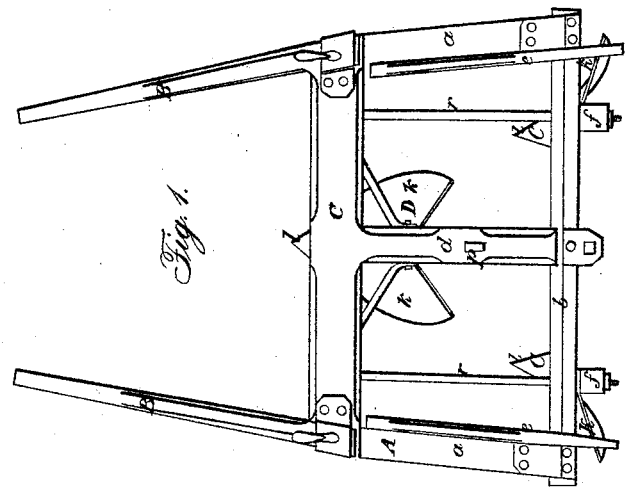
Witnesses:
Inventor:
John G. Christopher

UNITED STATES PATENT OFFICE.

JNO. G. CHRISTOPHER, OF BYRON, ILLINOIS.

IMPROVEMENT IN CULTIVATORS.

Specification forming part of Letters Patent No. 27,776, dated April 10, 1860.

*To all whom it may concern:*

Be it known that I, JOHN G. CHRISTOPHER, of Byron, in the county of Ogle and State of Illinois, have invented a new and Improved Cultivator; and I do hereby declare that the following is a full, clear, and exact description of the same, reference being had to the annexed drawings, making a part of this specification, in which—

Figure 1 is a plan or top view of my invention; Fig. 2, a back view of the same; Fig. 3, a side view of the same, the front plow being bisected vertically and centrally. Figs. 4 and 5 are detached perspective views of two of the plows used in my invention.

Similar letters of reference indicate corresponding parts in the several figures.

The object of this invention is to obtain a cultivator that may be rendered capable of performing various kinds of work, as may be required, and by a very simple adjustment of parts.

To enable those skilled in the art to fully understand and construct my invention, I will proceed to describe it.

A represents a frame, to which thills B B are attached. This frame A is formed simply of two side pieces, *a a*, connected at their back ends by a travene-bar, *b*, and at their front ends by a travene-bar, *c*, the two travene-bars being connected at their centers by a longitudinal bar, *d*, as shown clearly in Fig. 1. Handles *e e* are attached to the side pieces, *a a*, of the frame A, and to the back travene-bar, *b*, of the frame A two standards, *f f*, are attached by screws or bolts *g*, which may pass through either of a series of holes, *h*, in the bar *b*, according to the distance required between said standards.

To the lower part of each standard *f* a plow, C, is attached. These plows are of the kind generally known as "single plows"—that is to say, having but one mold-board, and consequently turning or throwing the earth in one direction only. One of the plows C is a right-handed one and the other is left-handed, and they are so attached to the implement that the earth will be thrown outward from the machine.

To the bar *d* of the frame A a standard, *i*, is attached. This standard has a slightly-inclined position, as shown clearly in Fig. 3, and to this standard a double mold-board plow is attached.

All of the plows are formed each of one piece, and combine a colter, mold-board, and share. The front part of each plow is swaged or cast so as to be sharply prominent and form a vertical or slightly-inclined edge, *j*, as shown clearly in Figs. 4 and 5. Both the single and the double plow are provided with this sharp projection, and they form colters which effectually divide all grass, sods, clods of earth &c., with which they may come in contact. The mold-boards *k* are formed in the usual way, and the shares *l* are formed by giving a proper forward curvature to the lower parts of the plows. The single plows C C may be described as forming just half of the double one vertically bisected.

The double plow D is attached to its standard *i* by travene-rods *m m*, which rest on pins *n*, that pass into the back of the standard *i*, (see Fig. 3;) and to the back side of the standard there is attached a guide, *o*, through which a bar, *p*, passes, said bar also passing through the bar *d* of the frame A and screwed therein by a pin, *q*, at any desired point.

Each standard *f* is braced by rods *r*, the front ends of which are attached to the front travene-bar, *c*, and the standard *i* is braced by rods *s*.

To the lower end of the bar *p* a roller, *t*, is attached, and when the implement is used with the three plows the bar *p* is elevated, so that the roller *t* will be free from the surface of the ground, as shown clearly in Figs. 2 and 3. If two plows are only to be used, the front double one, D, is detached from its standard and the bar *p* lowered, so that its roller *t* may rest on the ground and support the front part of the machine. If one plow only is required to be used, the two back single plows, C C, are detached from their standards and the bar *p* detached from standard *i* and inserted in guides *n n* at the center of the back travene-bar, *b*, so as to support the back part of the machine. In order to adjust the plows nearer together or farther apart, the standards *f* are adjusted nearer together or farther apart on the bar *b*, as previously described.

Having thus described my invention, what I claim as new, and desire to secure by Letters Patent, is—

In combination with the plows C C D, the adjustable bar *p*, provided with the roller *t* and arranged to permit of the adjustment as shown, for the purpose set forth.

JOHN G. CHRISTOPHER.

Witnesses:
J. S. LAWRENCE,
CLINTON HELM.